United States Patent
Carames (10) Patent No.: US 11,671,477 B2
(45) Date of Patent: *Jun. 6, 2023

(54) FIREWALL MULTI-LEVEL SECURITY DYNAMIC HOST-BASED SANDBOX GENERATION FOR EMBEDDED URL LINKS

(71) Applicant: SONICWALL US HOLDINGS INC., Milpitas, CA (US)

(72) Inventor: Hugo Vazquez Carames, Barcelona (ES)

(73) Assignee: SONICWALL INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,203

(22) Filed: Apr. 12, 2022

(65) Prior Publication Data
US 2022/0239722 A1    Jul. 28, 2022

Related U.S. Application Data

(63) Continuation of application No. 16/251,818, filed on Jan. 18, 2019, now Pat. No. 11,303,693, which is a (Continued)

(51) Int. Cl.
*H04L 29/06*    (2006.01)
*H04L 67/02*    (2022.01)
(Continued)

(52) U.S. Cl.
CPC .............. *H04L 67/02* (2013.01); *G06F 21/53* (2013.01); *H04L 63/0227* (2013.01); *H04L 63/1441* (2013.01); *H04L 63/168* (2013.01)

(58) Field of Classification Search
CPC .... G06F 21/51; G06F 21/54; G06F 17/30887; G06F 17/30893; G06F 21/53; G06F 2221/2119; H04L 67/02
See application file for complete search history.

(56) References Cited

U.S. PATENT DOCUMENTS 7,310,815 B2    12/2007   Yanovsky
7,545,748 B1     6/2009   Riddle
(Continued)

FOREIGN PATENT DOCUMENTS

EP           1 143 660          10/2001

OTHER PUBLICATIONS

U.S. Appl. No. 14/665,315 Final Office Action dated Jun. 4, 2018.
(Continued)

*Primary Examiner* — Harunur Rashid
(74) *Attorney, Agent, or Firm* — Polsinelli LLC (57) ABSTRACT

A firewall may identify a uniform resource locator (URL) being transmitted to a user device, the URL link pointing to a host system. The firewall can then modify the URL link to point instead to a sandbox system. Once a user at the user device selects the URL link (e.g., by clicking or touching it in a browser), the firewall receives the user device's HTTP request and directs it to the sandbox system, which generates a new HTTP request that is then sent through the firewall to the host system. The host system then sends host content to the sandbox system instead of to the user device. The user device may then be presented with a representation of the host content as rendered at the sandbox system (e.g., through a remote desktop interface).

17 Claims, 5 Drawing Sheets

Related U.S. Application Data continuation of application No. 14/665,315, filed on Mar. 23, 2015, now Pat. No. 10,187,446.

(51) Int. Cl.
*H04L 9/40* (2022.01)
*G06F 21/53* (2013.01)

(56) References Cited

U.S. PATENT DOCUMENTS

| | | |
|---|---|---|
| 7,620,988 B1 | 11/2009 | Hernacki |
| 8,082,585 B1* | 12/2011 | Givonetti ............. G06F 21/567 713/188 |
| 8,601,114 B1 | 12/2013 | Cooper |
| 9,118,582 B1* | 8/2015 | Martini ................. H04L 67/568 |
| 9,485,231 B1 | 11/2016 | Reese |
| 9,608,959 B2 | 3/2017 | Carames |
| 9,825,921 B2 | 11/2017 | Reese |
| 9,838,357 B2 | 12/2017 | Carames |
| 9,888,011 B2 | 2/2018 | Carames |
| 10,057,271 B2 | 8/2018 | Carames |
| 10,110,571 B2 | 10/2018 | Reese |
| 10,187,446 B2 | 1/2019 | Carames |
| 10,225,235 B2 | 3/2019 | Carames |
| 11,303,693 B2 | 4/2022 | Carames |
| 2004/0039940 A1 | 2/2004 | Cox et al. |
| 2005/0010816 A1 | 1/2005 | Yu et al. |
| 2005/0131997 A1 | 6/2005 | Lewis et al. |
| 2006/0085850 A1 | 4/2006 | Mayfield |
| 2007/0271361 A1 | 11/2007 | Abzarian et al. |
| 2010/0034178 A1 | 2/2010 | Bhar |
| 2010/0192224 A1 | 7/2010 | Ferri et al. |
| 2011/0179362 A1 | 7/2011 | Craddock et al. |
| 2012/0304119 A1* | 11/2012 | Hoogerwerf ............ G06F 16/13 715/810 |
| 2013/0094376 A1 | 4/2013 | Reeves |
| 2013/0125236 A1 | 5/2013 | Lalonde et al. |
| 2013/0290404 A1* | 10/2013 | Rajabi ................... G06F 16/972 709/203 |
| 2013/0291076 A1 | 10/2013 | Duryee et al. |
| 2014/0007183 A1* | 1/2014 | Qureshi ............. H04L 63/0428 726/1 |
| 2014/0344928 A1 | 11/2014 | Sreedharan et al. |
| 2015/0007312 A1 | 1/2015 | Pidathala et al. |
| 2015/0074259 A1 | 3/2015 | Ansari et al. |
| 2015/0101008 A1 | 4/2015 | Zent et al. |
| 2015/0213259 A1* | 7/2015 | Du .......................... G06F 21/53 726/27 |
| 2015/0288709 A1 | 10/2015 | Singhal et al. |
| 2016/0057045 A1 | 2/2016 | Gustin |
| 2018/0139179 A1 | 5/2018 | Ettema et al. |

OTHER PUBLICATIONS

U.S. Appl. No. 14/665,315 Office Action dated Oct. 19, 2017.
U.S. Appl. No. 14/665,315 Final Office Action dated Mar. 1, 2017.
U.S. Appl. No. 14/665,315 Office Action dated Aug. 11, 2016.
U.S. Appl. No. 16/251,818 Final Office Action dated Aug. 5, 2021.
U.S. Appl. No. 16/251,818 Office Action dated Feb. 4, 2021.
U.S. Appl. No. 16/251,818 Final Office Action dated Oct. 6, 2020.
U.S. Appl. No. 16/251,818 Office Action dated Apr. 30, 2020.
U.S. Appl. No. 14/666,180 Final Office Action dated Aug. 22, 2016.
U.S. Appl. No. 14/666,180 Office Action dated Apr. 28, 2016.
U.S. Appl. No. 15/434,603 Office Action dated Mar. 24, 2017.
U.S. Appl. No. 14/815,866 Final Office Action dated Jun. 21, 2017.
U.S. Appl. No. 14/815,866 Office Action dated Jan. 12, 2017.
U.S. Appl. No. 15/602,483 Final Office Action dated Nov. 30, 2017.
U.S. Appl. No. 15/602,483 Office Action dated Jun. 22, 2017.

* cited by examiner

FIREWALL MULTI-LEVEL SECURITY DYNAMIC HOST-BASED SANDBOX GENERATION FOR EMBEDDED URL LINKS

CROSS-REFERENCE TO RELATED APPLICATIONS

This application is a continuation and claims the priority benefit of U.S. patent application Ser. No. 16/251,818 filed Jan. 18, 2019, now U.S. Pat. No. 11,303,693, which is a continuation and claims the priority benefit of U.S. patent application Ser. No. 14/665,315 filed Mar. 23, 2015, now U.S. Pat. No. 10,187,446, the disclosures of which are incorporated herein by reference.

BACKGROUND

1. Field of the Invention

The present invention generally relates to computer network firewall systems. More specifically, the present invention relates to firewall-based redirection of browser links to external sandbox environments.

2. Description of the Related Art

One of the uses of internet-based communications (e.g., e-mail, instant messaging, social network messaging, and web browsing) is the ability to send, receive, and open uniform resource locator (URL) links (i.e., "hyperlinks") to external internet resources (e.g., websites). Sometimes, these links direct a browser of a user's device to benign web content, such as a news web page or an image. Other times, such links may direct the browser of the user's device to dangerous web content that may infect the user's device with viruses, malware, spyware, adware, tracking cookies, or other potentially harmful software. Sometimes, URL links are disguised using various methods to appear as benign URL links, but redirect the user's browser to dangerous web content.

In some cases, a user device directed to dangerous web content may receive and execute harmful software. This harmful software may then automatically spread itself or other harmful software to other computers in the user's network, or may grant a malicious party access to the user's computer or other computers in the user's network. This is a particularly dangerous problem in corporate environments, where infection of sensitive computer systems may result in leaks of trade secret information to competitors or to the public, leaks of sensitive emails and insider information, loss of technical research data, delayed product launches, unproductive workers, unhappy investors, and other issues. This is also a particularly dangerous problem in government environments, where infection of sensitive computer systems may result in leaks of sensitive or classified national security information (e.g., troop movements, top-secret projects, sensitive communications) to rival nations or terrorist organizations or to the public. Such leaks could cause international political problems, unnecessary loss of military lives or resources in compromised missions, loss of political research data, undermining the reliability of digital court evidence, endangerment of protected witnesses, demoralizing government workers, and other issues.

Typically, firewall systems accept incoming data, filter through the incoming data to identify and block potentially dangerous incoming data, and only allow transmission of data that is safe to transmit. Some firewalls also include policies that automatically perform antivirus scans of data that the firewall has deemed to be otherwise allowable, which may further be used to block dangerous data.

Despite offering some protection, typical firewalls do not always recognize and protect against entry of all viruses, malware, spyware, adware, tracking cookies, or other potentially harmful software onto a user's device. Malicious attackers and security specialists emulating malicious attacking techniques have developed and will continue to develop creative workarounds that allow malicious, potentially harmful software onto a user's device by taking advantage of loopholes and other weaknesses of a firewall.

There is, therefore, a need in the art for improved firewall systems.

SUMMARY OF THE CLAIMED INVENTION

Embodiments of the present invention provide an exemplary firewall that may identify a first uniform resource locator (URL) link embedded within a first content set transmitted to a user device. That first URL link may point to a host system. The firewall may then reconfigure the first URL link to point to a sandbox system. The firewall may then receive a first Hypertext Transfer Protocol (HTTP) request from the user device related to the URL link. The firewall may then transmit a second HTTP request to the host system. The second HTTP request may originate from the sandbox system. The firewall may then receive a second content set from the host system. The firewall may then transmit the second content set to the sandbox system to be rendered by a first process of the sandbox system. The firewall may then receive a third content set from the sandbox system. The third content set may be a representation of the second content set as rendered by the first process of the sandbox system. The firewall may then transmit the third content set to the user device.

A sandbox system may receive the first HTTP request from the user device, transmit the second HTTP request to the host system, receive the second content set from the host system, and then generate the third content set based on a rendering of the second content set by the first process. The sandbox system may then transmit the third content set to the user device.

Various embodiments of the present invention may further include non-transitory computer-readable storage media, having embodied thereon a firewall program executable by a processor to perform the methods described herein.

DETAILED DESCRIPTION

Embodiments of the present invention are directed generally to systems and methods of operating a firewall. A firewall may identify a uniform resource locator (URL) being transmitted to a user device (e.g., embedded within an email message or browser page). Such a URL link may point to a host system. The firewall can then modify the URL link to point instead to a sandbox system. Once a user at the user device selects the URL link (e.g., by clicking or touching in a browser), the firewall receives the user device's HTTP request and directs the HTTP request to the sandbox system, which generates a new HTTP request that is then sent through the firewall to the host system. The host system then sends host content to the sandbox system instead of to the user device. The user device may then be presented with a representation of the host content as rendered at the sandbox system (e.g., through a remote desktop interface).

Figure 1:
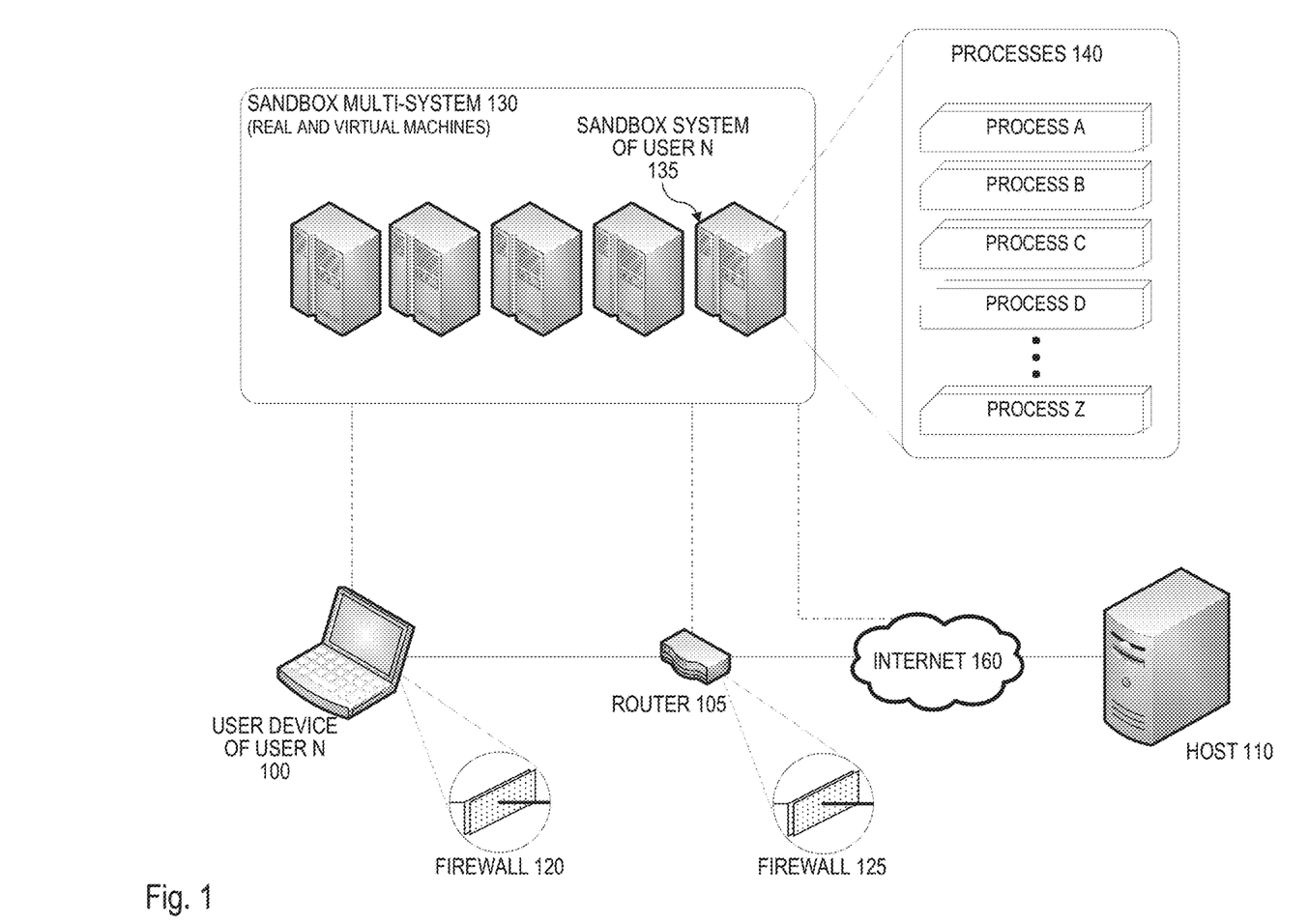
FIG. 1 illustrates an exemplary network architecture in which an exemplary firewall system with a sandbox multi-system may be implemented.

FIG. 1 illustrates an exemplary network architecture in which an exemplary firewall system with a sandbox multi-system 130 may be implemented. The network architecture may include a host system 110, a user device of a user N 100, and a router 105. References to the "user device 100" herein should be understood to refer to the user device of User N 100.

The user device 100 may execute a user firewall 120, and the router 105 may execute a router firewall 125. In some embodiments, only one of these two firewalls (e.g., firewalls 120, 125) is included, while in other embodiments, both may be included.

In some embodiments, the router 105 may be missing, and the host system 110 may be connected directly to user device 100, either through the internet 160 or through a direct connection (e.g., where the host system 110 is in the same internal network as the user device 100, or where the host system 110 and the user device 100 are both virtual machines running on the same parent machine).

The sandbox system multi-system 130 is a collection of individual sandbox systems (e.g., sandbox system of user N 135). The individual sandbox systems may be physical computer systems, virtual machines, or a combination of both. Some or all of these individual sandbox systems may be networked together in a local area network (LAN) or wireless LAN (WLAN). The sandbox multi-system 130 may be connected to the firewall 120 and firewall 125, either through a direct connection or through a connection to the internet 160. In one embodiment, some sandbox systems of the sandbox multi-system 130 are directly connected to a firewall (e.g., firewalls 120, 125), while other sandbox systems of the sandbox multi-system 130 are connected to the firewall (e.g., firewalls 120, 125) through the internet 160. References to the "sandbox system 135" herein should be understood to refer to the sandbox system of user N 135.

In some embodiments, the sandbox multi-system 130 may be used to protect the user device 100 from dangerous or malicious web content accessed by interacting with a uniform resource locator (URL) link (i.e., a "hyperlink") pointing to a host system 110 that is embedded in content sent to the user device 100. For example, such a URL link may be embedded in an email message, in an instant messenger message, in a web page, in a received document, in a social media notification, in a weather app notification, in a search app notification, or in a news notification). The user device 100 may then be assigned an individual sandbox system of the sandbox multi-system 130 (e.g., individual sandbox system 135). The firewall (e.g., firewall 120 or firewall 125 or both) may then reconfigure incoming URL links to point to individual sandbox system 135 corresponding to the user device 100, instead of pointing to the host system 110. The firewall may perform this reconfiguration, for example, by changing the URL of the link before the content in which the URL link is embedded is transmitted to the user device 100. When a user of the user device 100 interacts with the URL link (e.g., clicks the URL link using a mouse interface, touches the URL link using a touch interface, or selects the URL link using a keyboard interface), the user device 100 transmits an Hypertext Transfer Protocol (HTTP) request to the individual sandbox system 135 instead of directly to the host system 110. The individual sandbox system 135 then transmits its own HTTP request to the host system 110, after which the host's web content is received from the host system 110. Once the host's web content is received from the host system 110, the individual sandbox system 135 opens an isolated browser process (e.g., processes A-Z of processes 140) and renders the host's web content using the allocated process at the individual sandbox system 135. The individual sandbox system 135 may then generate a representation of the host's web content, as rendered at the individual sandbox system 135, and transmit this representation to the user device 100. This representation may be transferred to the user device 100 through a remote access protocol, such as a remote framebuffer protocol, as used in remote access software such as Virtual Networking Computing (VNC) software. While the processes 140 of sandbox system 135 are listed as including processes A-Z, it should be understood that the sandbox system 135 may, in some embodiments, execute more than 26 processes.

User device 100 may be any type of computing device, including a smartphone, a tablet, a laptop computer, a desktop computer, a gaming console, a smart television, a home entertainment system, a wearable device, a portable networked media player, a networked appliance, a network device, a structured query language (SQL) server, a web front-end server, a central administration server, an index server, a database server, an application server, a gateway server, a broker server, an active directory server, a terminal server, a virtualization services server, a virtualized server, a file server, a print server, an email server, a security server, a connection server, a search server, a license server, a "blade" server, a virtual machine, a "thin" client, a Redundant Arrays of Independent Disks (RAID) array, or any other type of computing device.

User device 100 may include a variety of components, which may be physical, virtual (e.g., simulated functionality in a virtual machine), or some combination thereof. These components may include, for example, a processor, a memory, a display, a keyboard, a mouse, a touchscreen, a battery, a non-volatile storage system, a hard drive, a basic input/output system (BIOS), a floppy disk reader, a floppy disk writer, a compact disc (CD) reader, a CD writer, a digital versatile disc (DVD) reader, a DVD writer, a high-definition digital versatile disc (HD-DVD) reader, an HD-DVD writer, a Blu-Ray disc reader, a Blu-Ray disc writer, a holographic disc reader, a holographic disc writer, a wired and/or wireless communication interface (e.g, a USB port module, a FireWire port module, a Lightning port module, a Thunderbolt port module, a Wi-Fi connection module, a 3G/4G/LTE cellular connection module, a Bluetooth connection module, a Bluetooth low energy connection module, a Bluetooth Smart connection module, a near field communication module, a radio wave communications module), and other components. The processor may execute an operating system and a variety of other software elements.

Host system 110 may be any type of computing device, including a smartphone, a tablet, a laptop computer, a desktop computer, a gaming console, a smart television, a home entertainment system, a wearable device, a portable networked media player, a networked appliance, a network device, a structured query language (SQL) server, a web front-end server, a central administration server, an index server, a database server, an application server, a gateway server, a broker server, an active directory server, a terminal server, a virtualization services server, a virtualized server, a file server, a print server, an email server, a security server, a connection server, a search server, a license server, a "blade" server, a virtual machine, a "thin" client, a Redundant Arrays of Independent Disks (RAID) array, or any other type of computing device.

Host system 110 may include a variety of components, which may be physical, virtual (e.g., simulated functionality in a virtual machine), or some combination thereof. These components may include, for example, a processor, a memory, a display, a keyboard, a mouse, a touchscreen, a battery, a non-volatile storage system, a hard drive, a basic input/output system (BIOS), a floppy disk reader, a floppy disk writer, a compact disc (CD) reader, a CD writer, a digital versatile disc (DVD) reader, a DVD writer, a high-definition digital versatile disc (HD-DVD) reader, an HD-DVD writer, a Blu-Ray disc reader, a Blu-Ray disc writer, a holographic disc reader, a holographic disc writer, a wired and/or wireless communication interface (e.g, a USB port module, a FireWire port module, a Lightning port module, a Thunderbolt port module, a Wi-Fi connection module, a 3G/4G/LTE cellular connection module, a Bluetooth connection module, a Bluetooth low energy connection module, a Bluetooth Smart connection module, a near field communication module, a radio wave communications module), and other components. The processor may execute an operating system and a variety of other software elements.

The term "sandbox" as used, for example, to refer to the sandbox multi-system 130 and sandbox system of user N 135, is not intended to limit the type of computer system (or virtual machine) that each individual sandbox system may be. The term "sandbox" is used to indicate that it is more acceptable to subject these sandbox (physical or virtual) computer systems to potentially dangerous web content than it is to subject the user device 100 to potentially dangerous web content. More specifically, while it is important to protect the user machine of user N 100 from infection by viruses and malware, the individual sandbox system of user N 135 (of the sandbox multi-system 130) may be infected during operation of the present invention without ill effect to the user device of user N 100.

In the event that an individual sandbox system of user N 135 corresponding to the user device of user N 100 is infected, the individual sandbox system of user N 135 may be replaced with a new individual sandbox system that is then designated to be the new individual sandbox system of user N 135, while the original individual sandbox system of user N 135 is wiped clean (e.g., hard drives reformatted). Such a replacement may be performed transparently (i.e., the user device 100 is unaware of the change in sandbox system) or may be performed "noisily" (i.e. the user device 100 is notified with an alert indicating that the web content was dangerous and the sandbox system of user N 135 had to be wiped clean and/or replaced).

Each individual sandbox system (e.g., sandbox system 135) of the sandbox multi-system 130 may be any type of computing device. For example, it may be a smartphone, a tablet, a laptop computer, a desktop computer, a gaming console, a smart television, a home entertainment system, a wearable device, a portable networked media player, a networked appliance, a network device, a structured query language (SQL) server, a web front-end server, a central administration server, an index server, a database server, an application server, a gateway server, a broker server, an active directory server, a terminal server, a virtualization services server, a virtualized server, a file server, a print server, an email server, a security server, a connection server, a search server, a license server, a "blade" server, a virtual machine, a "thin" client, a Redundant Arrays of Independent Disks (RAID) array, or any other type of computing device.

Each individual sandbox system (e.g., sandbox system 135) of the sandbox multi-system 130 may include a variety of components, which may be physical, virtual (e.g., simulated functionality in a virtual machine), or some combination thereof. These components may include, for example, a processor, a memory, a display, a keyboard, a mouse, a touchscreen, a battery, a non-volatile storage system, a hard drive, a basic input/output system (BIOS), a floppy disk reader, a floppy disk writer, a compact disc (CD) reader, a CD writer, a digital versatile disc (DVD) reader, a DVD writer, a high-definition digital versatile disc (HD-DVD) reader, an HD-DVD writer, a Blu-Ray disc reader, a Blu-Ray disc writer, a holographic disc reader, a holographic disc writer, a wired and/or wireless communication interface (e.g, a USB port module, a FireWire port module, a Lightning port module, a Thunderbolt port module, a Wi-Fi connection module, a 3G/4G/LTE cellular connection module, a Bluetooth connection module, a Bluetooth low energy connection module, a Bluetooth Smart connection module, a near field communication module, a radio wave communications module), and other components. The processor may execute an operating system and a variety of other software elements.

In embodiments where the sandbox system 130 is a distributed sandbox network system 130 that includes a number of individual computer systems like those described above, each of the computer systems of the sandbox system 130 may be of a same, similar, or different type than the other computer systems of the distributed sandbox system 130.

Although user device 100, router 105, host system 110, and the computer systems of the distributedسsandbox system 130 are each illustrated as different-looking computer systems within the exemplary depiction of FIG. 1, this illustration should be viewed as illustrative rather than limiting. In some embodiments, two or more of these machines may be the same type of machine.

One or both firewalls (user firewall 120, router firewall 125) may be a software firewall (e.g., a software program executed by a processor), a hardware firewall (e.g., a set of hardware components coupled to a communication interface and/or a processor that operates as a firewall), or some combination thereof (e.g., a firewall software executed by a processor and interacting with firewall hardware coupled to the processor and/or communication interface).

Figure 2:
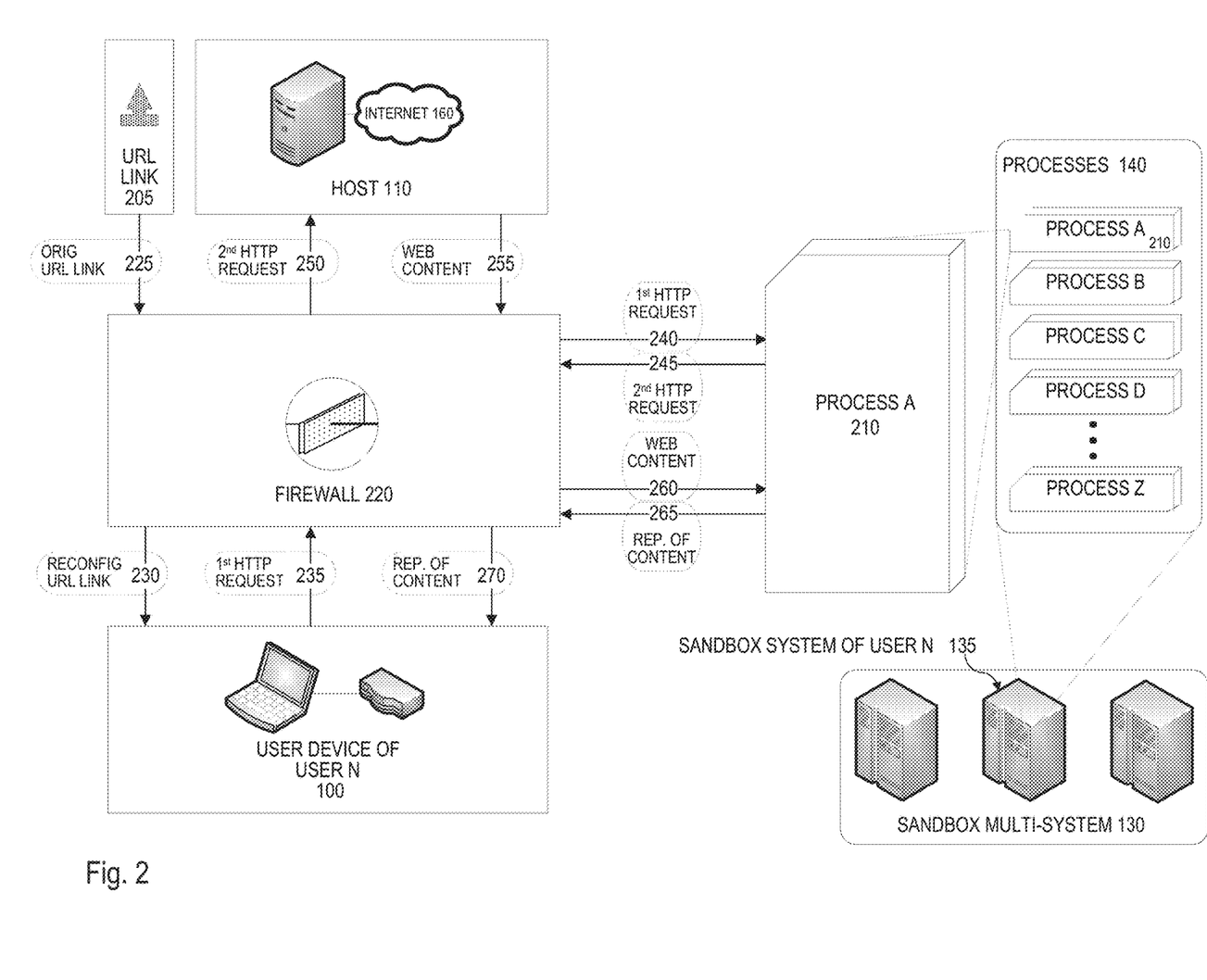
FIG. 2 illustrates exemplary communications between different devices in a network that includes a firewall with a sandbox multi-system.

FIG. 2 illustrates communications between different devices in an exemplary architecture that includes an exemplary firewall 220. The firewall 220 may be an embodiment of user firewall 120 and/or of router firewall 125 of FIG. 1. In particular, FIG. 2 illustrates a process of a user device 100 clicking an embedded URL link 205 and receiving a representation (e.g., representations 265, 270) of the potentially dangerous web content (e.g., web content 255, 260) that the URL link 205 linked to without being exposed to the potential danger.

The process begins when the firewall 220 intercepts a uniform resource locator (URL) link 205 embedded in data transmitted to the user device 100. The URL link 205 may be embedded in any type of data (e.g., an email message, an instant messenger message, a web page, a received document, a social media app notification, a weather app notification, a search app notification, or a news app notification).

The firewall 220 then receives the URL link 205 (via "original URL link" transmission 225). The firewall 220 then assigns the user device of user N 100 to an individual sandbox system 135 of the sandbox-multi-system 130 (if it was not assigned already). The individual sandbox system 135 is now the individual sandbox system of User N 135, though references herein to the "individual sandbox system 135" should be understood to refer to the individual sandbox system of User N 135.

Once the firewall 220 has reconfigured the URL link 205 to point to the sandbox system 135, the firewall 220 transmits the reconfigured version of the URL link 205 to the user device 100 (via "reconfigured URL link" transmission 230).

Once the user device 100 receives the reconfigured URL link (via "reconfigured URL link" transmission 230), the user device 100 may display the reconfigured URL link along with any data/content in which the URL link was embedded (e.g., in an internet browser application, an email application, an instant messaging application, an SMS text messaging application, a social media application, a news reader application, a rich site summary (RSS) reader application, an e-book reader application, a search application, a link aggregator application, or a post aggregator application). The user device 100 may then receive an input indicating a desire to retrieve the web content at the reconfigured URL link (e.g., a mouse click of the URL link, a touch of a touchscreen at the URL link, or a keyboard selection selecting the URL link). This input may trigger the user device 100 to transmit a first Hypertext Transfer Protocol (HTTP) request according to the reconfigured URL link.

The first HTTP request will go through the firewall 220 (via "1$^{st}$ HTTP request" transmission 235) and to the sandbox system 135 (via "1$^{st}$ HTTP request" transmission 240).

The sandbox system 135 then receives the first HTTP request from the user device 100 (via "1$^{st}$ HTTP request" transmission 240). The sandbox system 135 then generates a second HTTP request, the second HTTP request directed at the host system 110 that the URL link 215 originally pointed at before being reconfigured at the firewall 220. The sandbox system 135 then transmits the second HTTP request through the firewall 220 (via "2$^{nd}$ HTTP request" transmission 245) and to the host system 110 (via "2$^{nd}$ HTTP request" transmission 250). In some embodiments, these actions of the sandbox system 135 are performed using a single process ("Process A 210").

Once the host system 110 receives the second HTTP request (via "2$^{nd}$ HTTP request" transmission 250), it treats it as it would any other HTTP request, and transmits the web content stored at the host system 110 that was requested by the second HTTP request through the firewall 220 (via "web content" transmission 255) and to the sandbox system 135 (via "web content" transmission 260).

Once the sandbox system 135 receives the host web content from the host system 110 (via "web content" transmission 260), it starts an isolated web browser instance using a process 210 ("process A") of a set of processes 140 (which may include only Process A 210 in some embodiments, or may include an unlimited number of other processes in other embodiments). The browser of Process A 210 renders the web content from the host system 110 (from "web content" transmission 260). The sandbox system 138 then generates a representation of the web content as rendered by the isolated browser instance of Process A 210. The sandbox system 135 then transmits this representation of the web content through the firewall 220 (via "representation of content" transmission 265) and to the user device 100 (via "representation of content" transmission 270).

The user device 100 then receives the representation of the web content as generated by Process A 210 of the sandbox system 135. The representation of the web content may be any transmitted via any type of communication that wouldn't transmit any malicious or dangerous code from the isolated browser instance of Process A 210. For example, the representation of the web content may be any transmitted via a remote framebuffer protocol, as is typically used by remote desktop applications such as Virtual Network Computing (VNC) applications. In this way, a user N using the user device 100 could perform any interactions with the web content transparently through the browser of the user device 100 as if the web content was rendered at the user device 100. The system should thus be interoperable with any type of user device 100 regardless of hardware ability and regardless of operating system (e.g., Windows, Apple Mac OSX, Linux, Unix, Apple iOS, Google Android, Windows Phone OS, Blackberry OS, Palm OS, or any other operating system) and transparent to the user.

In other embodiments, the representation of the web content may be transmitted in a different format. For example, the representation may be a stripped-down virus/malware-scanned version of the web content, a document form of the web content (e.g., a Portable Document Format "PDF" file), an image of the web content as rendered (e.g., a JPG, GIF, PNG, TIF, or other type of image file).

Figure 3:
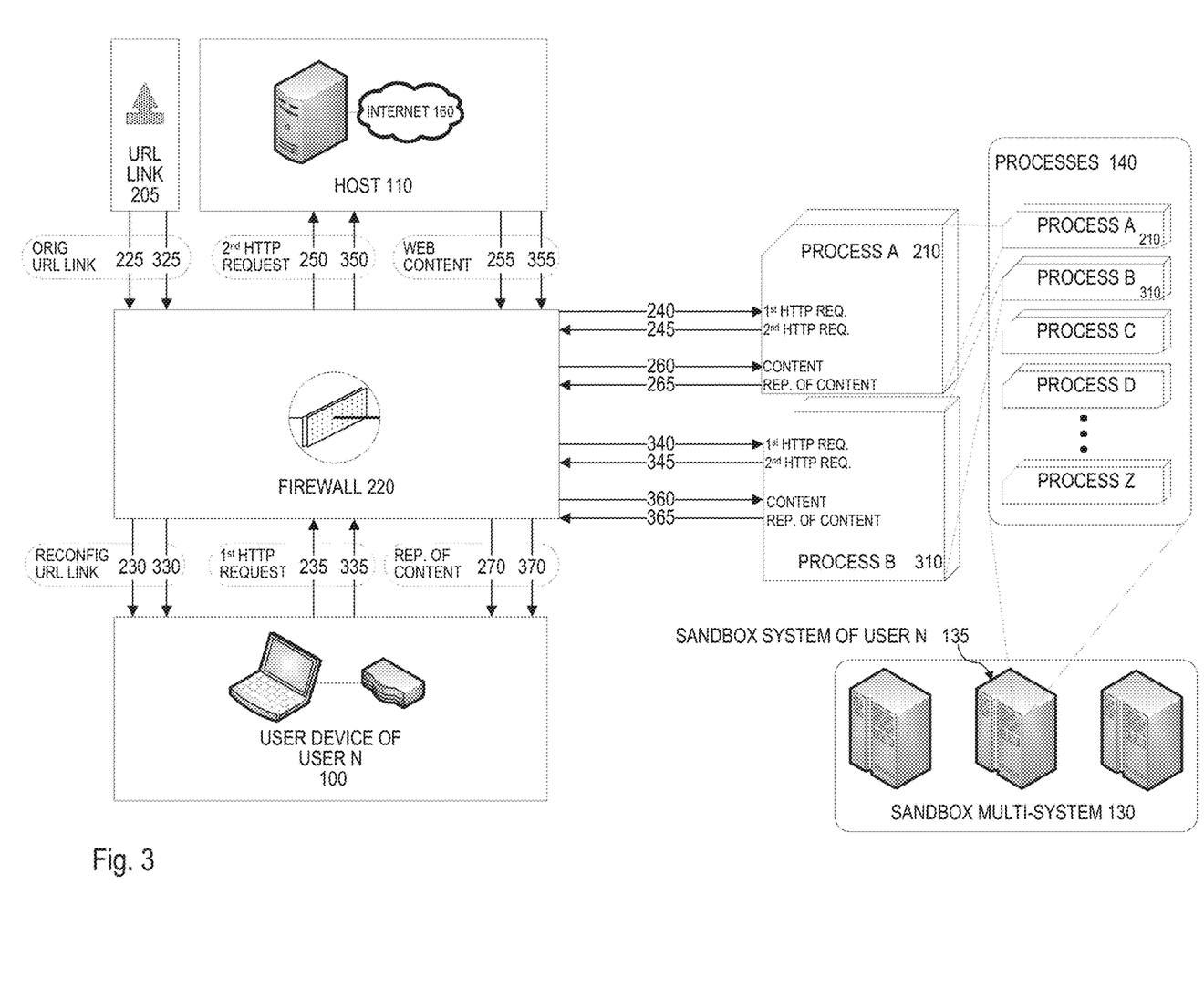
FIG. 3 illustrates exemplary communications between different devices in a network that includes a firewall with a sandbox multi-system, and where a single user device selects multiple consecutive URL links.

FIG. 3 illustrates communications between different devices in an exemplary architecture that includes an exemplary firewall, and where a single user device selects multiple consecutive URL links.

In particular, two URL links are shown being received by the firewall 220 (via "original URL link" transmissions 225 and 325). One may be received after the other, or one may be received before the other. Though the source of these URL links is illustrated as if it were the same source ("URL Link 205"), this is intended as a placeholder, and may represent any URL link source for either or both of the URL links. Accordingly, the original URL links transmitted in transmission 225 and 325 may be different URL links from different sources 205.

Both URL links in FIG. 3 originally point to host 110. It should be understood that, in another embodiment, one URL link may point to host 110, while the second URL link may point to another host (not shown).

The firewall 220 reconfigures both URL links, so that instead of pointing to host 110, they point to the sandbox system of user N 135. In one embodiment, the firewall 220 reconfigures the first URL link to point to Process A 210 of sandbox system 135 (e.g., by specifying the Process A 210 in the URL), and reconfigures the second URL to point to Process B 310 of sandbox system 135. The firewall 220 then sends these reconfigured URLS on to the user device (via "reconfigured URL link" transmissions 230 and 330).

Once the user device 100 receives the reconfigured URL link (via "reconfigured URL link" transmissions 230 and 330), the user device 100 may display the reconfigured URL links along with any data/content in which the URL link was embedded. The user device 100 may then receive an input indicating a desire to retrieve the web content at one or both of the reconfigured URL links (e.g., a mouse click of one of the URL links, a touch of a touchscreen at one of the URL links, or a keyboard selection selecting one of the URL links). This input may trigger the user device 100 to transmit a first Hypertext Transfer Protocol (HTTP) request according to both of the reconfigured URL links.

The first HTTP request for the first URL link will go through the firewall 220 (via "$1^{st}$ HTTP request" transmission 235) and to Process A 210 of the sandbox system 135 (via "$1^{st}$ HTTP request" transmission 240). The first HTTP request for the second URL link will go through the firewall 220 (via "$1^{st}$ HTTP request" transmission 335) and to Process B 320 of the sandbox system 135 (via "Pt HTTP request" transmission 340).

The sandbox system 135 then receives the first HTTP requests from the user device 100 (via "$1^{st}$ HTTP request" transmissions 240 and 340). The sandbox system 135 then generates a second HTTP request corresponding to both of these, the second HTTP request directed at the host system 110 that the URL links originally pointed at before being reconfigured at the firewall 220. The sandbox system 135 then transmits the second HTTP requests through the firewall 220 (via "$2^{nd}$ HTTP request" transmissions 245 and 345) and to the host system 110 (via "$2^{nd}$ HTTP request" transmissions 250 and 350).

Once the host system 110 receives the second HTTP requests (via "$2^{nd}$ HTTP request" transmissions 250 and 350), it treats them as it would any other HTTP requests. The host system 110 transmits the web content stored at the host system 110 that was requested by the second HTTP request of the first URL through the firewall 220 (via "web content" transmission 255) and to Process A 210 of the sandbox system 135 (via "web content" transmission 260). The host system 110 transmits the web content stored at the host system 110 that was requested by the second HTTP request of the second URL through the firewall 220 (via "web content" transmission 355) and to Process B 310 of the sandbox system 135 (via "web content" transmission 360).

Once the sandbox system 135 receives the host web content from the host system 110 (via "web content" transmissions 260 and 360), it starts an isolated web browser instance using Process A 210 and an isolated web browser instance using Process B 310, both of the set of processes 140. The browser of Process A 210 renders the web content from the host system 110 as requested originally by the first URL (from "web content" transmission 260). The browser of Process B 310 renders the web content from the host system 110 as requested originally by the second URL (from "web content" transmission 360). The sandbox system 138 then generates representations of the web content as rendered by the isolated browser instances of Process A 210 and Process B 310. The sandbox system 135 then transmits this representations of the web content through the firewall 220 (via "representation of content" transmissions 265 and 365) and to the user device 100 (via "representation of content" transmissions 270 and 370).

The user device 100 then receives the representations of the web content as generated by Process A 210 and Process B 310 of the sandbox system 135. The user device 100 thus receives representations of the paths of both URL links, each rendered in a separate browser instance. Thus, multiple URL links (of the same web domain or otherwise) are separately rendered for additional protection. The user device 100 may select (e.g., receive a user's mouse click) the first URL first, and the second URL second, or vice versa, or the user device 100 may select these URL links at the same time.

Figure 4:
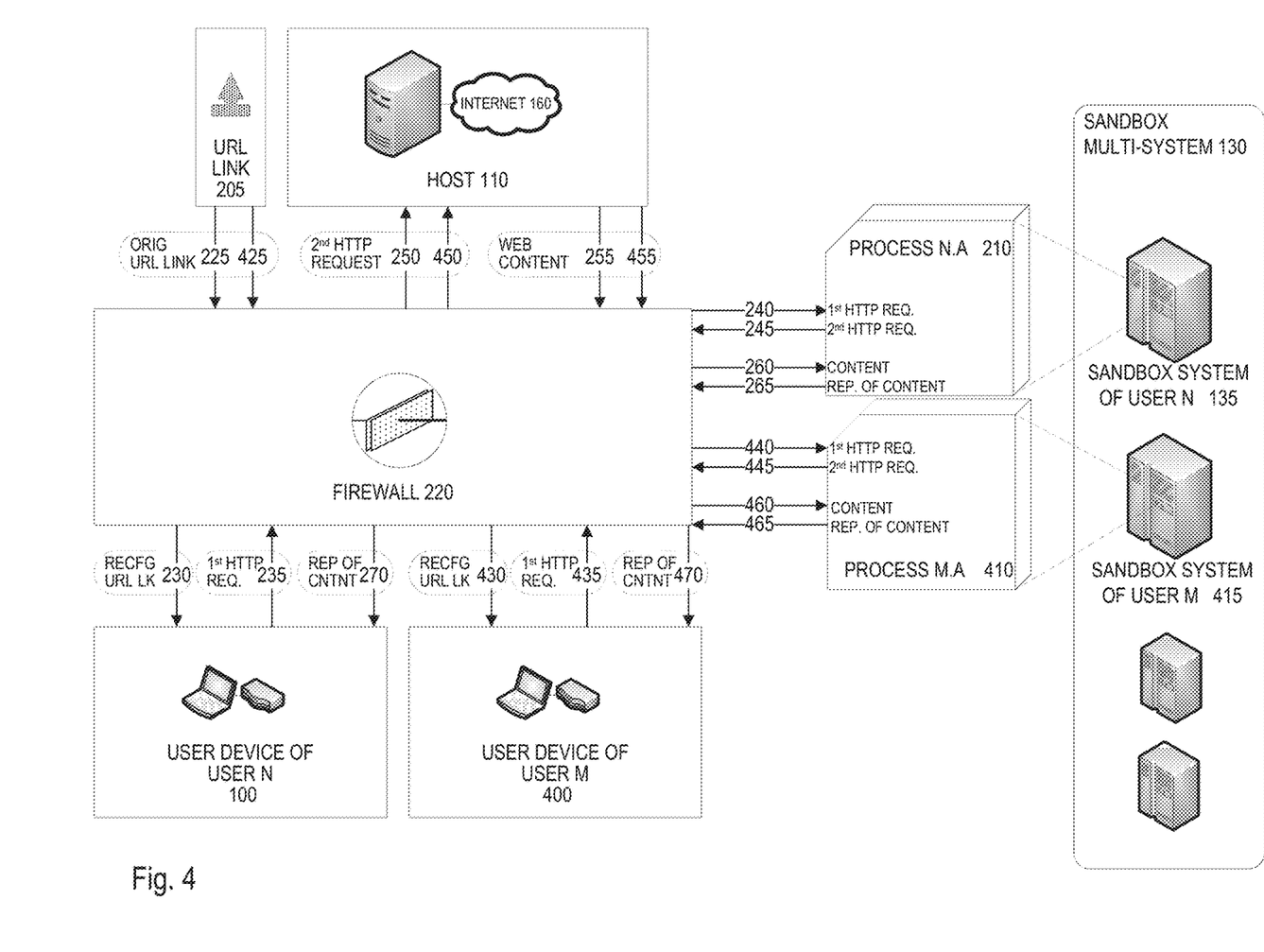
FIG. 4 illustrates exemplary communications between different devices in a system that includes a firewall with a sandbox multi-system, and where multiple user devices select a URL link.

FIG. 4 illustrates communications between different devices in an exemplary architecture that includes an exemplary firewall, and where multiple user devices (100, 400) select a URL link. The two user devices are a user device of user N 100 and a user device of user M 400.

In particular, two URL links are shown being received by the firewall 220 (via "original URL link" transmissions 225 and 425). One may be received after the other, or one may be received before the other. Though the source of these URL links is illustrated as if it were the same source ("URL Link 205"), this is intended as a placeholder, and may represent any URL link source for either or both of the URL links. Accordingly, the original URL links transmitted in transmission 225 and 425 may be different URL links from different sources 205.

Both URL links in FIG. 4 originally point to host 110. It should be understood that, in another embodiment, one URL link may point to host 110, while the second URL link may point to another host (not shown).

The firewall 220 reconfigures both URL links, so that instead of pointing to host 110, they point to a sandbox system of the sandbox multi-system 130. In particular, the URL link originally transmitted in transmission 225 is reconfigured to point to Process A 210 of the sandbox system of user N 135 (hereinafter referred to as Process N.A 210). This reconfigured URL link is then transmitted to the user device of user N 100 (via "reconfigured URL link" transmission 230). The URL link originally transmitted in transmission 425 is reconfigured to point to Process A 410 of the sandbox system of user M 415 (hereinafter referred to as Process M.A 410). This reconfigured URL link is then transmitted to the user device of user M 400 (via "reconfigured URL link" transmission 430).

Once the user device for user N 100 receives its reconfigured URL link (via "reconfigured URL link" transmission 230), the user device for user N 100 may display the reconfigured URL link, and upon an input (e.g., a mouse click of one of the URL links, a touch of a touchscreen at one of the URL links, or a keyboard selection selecting one of the URL links), the user device for user N 100 may transmit a first HTTP request through the firewall (via "$1^{st}$ HTTP request" transmission 235) and to Process N.A 210 (via "$1^{st}$ HTTP request" transmission 240).

Once the user device for user M 400 receives its reconfigured URL link (via "reconfigured URL link" transmission 430), the user device for user M 400 may display the reconfigured URL link, and upon an input (e.g., a mouse click of one of the URL links, a touch of a touchscreen at one of the URL links, or a keyboard selection selecting one of the URL links), the user device for user M 400 may transmit a first HTTP request through the firewall (via "$1^{st}$ HTTP request" transmission 435) and to Process M.A 410 (via "$1^{st}$ HTTP request" transmission 440).

Process N.A 210 then receives the first HTTP request from the user device 100 (via "$1^{st}$ HTTP request" transmission 240), generates a second HTTP request directed at the host system 110 that the URL link originally pointed at before being reconfigured at the firewall 220, and transmits the second HTTP request through the firewall 220 (via "$2^{nd}$ HTTP request" transmission 245) and to the host system 110 (via "$2^{nd}$ HTTP request" transmission 250). The host system 110 responds by providing web content back through the firewall 220 (via "web content" transmission 255) and to Process N.A 210 (via "web content" transmission 260). Process N.A 210 then renders the web content of the host 110, generates a representation of the web content, and transmits this representation of the web content through the firewall 220 (via "representation of content" transmission 265) and to the user device of user N 100 (via "web content" transmission 270) where it is reproduced for user N.

Process M.A 410 then receives the first HTTP request from the user device 400 (via "1st HTTP request" transmission), generates a second HTTP request directed at the host system 110 that the URL link originally pointed at before being reconfigured at the firewall 220, and transmits the second HTTP request through the firewall 220 (via "2nd HTTP request" transmission 445) and to the host system 110 (via "2nd HTTP request" transmission 450). The host system 110 responds by providing web content back through the firewall 220 (via "web content" transmission 455) and to Process M.A 410 (via "web content" transmission 460). Process M.A 410 then renders the web content of the host 110, generates a representation of the web content, and transmits this representation of the web content through the firewall 220 (via "representation of content" transmission 465) and to the user device of user M 400 (via "web content" transmission 470) where it is reproduced for user M.

It should be understood that the operations described in relation to User N, and the operations described in relation to User M can be performed in any order in relation to each other. That is, these operations may be occurring simultaneously, or one may be preceding the other. Because they are performed on different sandbox systems, different users' sessions have hardware-level isolation from each other, or at least virtual machine-level isolation if both sandbox systems 135 and 415 are virtual machines on the same physical machine within sandbox multi-system 130.

Figure 5:
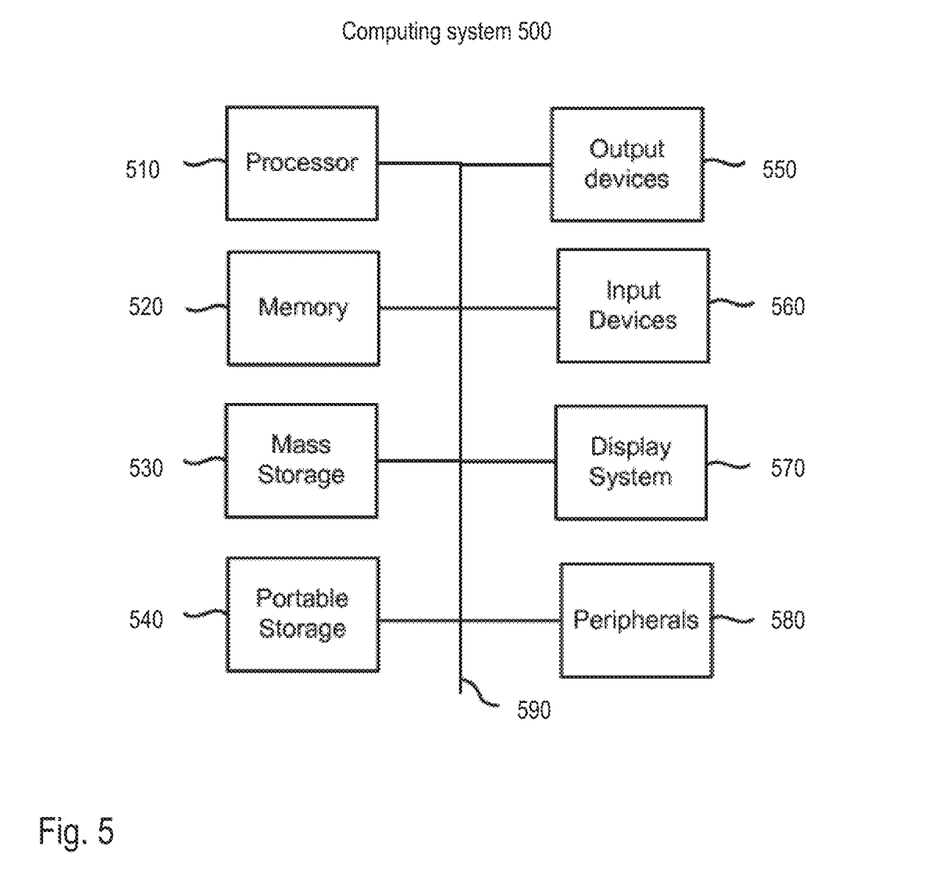
FIG. 5 is a block diagram of an exemplary computing device that may be used to implement an embodiment of the present invention.

FIG. 5 illustrates an exemplary computing system 500 that may be used to implement an embodiment of the present invention. For example, exemplary computing system 500 may be used as user system of user N 100, user system of user M 400, router 105, host system 110, any sandbox system (e.g., sandbox system of user N 135 or sandbox system of user M 415) of the sandbox multi-system 130, or any parent system of a virtual sandbox system of the sandbox multi-system 130. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for protecting requesting devices from infectious content, the method comprising:
   receiving at a sandbox computer a request for digital content at an original universal resource locator (URL) hosted by a host computer, wherein the original URL was embedded in a communication sent to a destination device, and wherein the request for the digital content originated at the destination device and was intercepted by a firewall that reconfigured the original URL into a reconfigured URL pointing to the sandbox computer;
   generating a second request for the digital content, the second request generated at the sandbox computer and responsive to the request received at the sandbox computer in accordance with the reconfigured URL;
   sending the second request from the sandbox computer to the host computer;
   retrieving the digital content from the host computer corresponding to the original URL;
   rendering the digital content retrieved from the host computer, wherein the digital content is rendered by an isolated browser instance of the sandbox computer;
   generating a representation of the digital content as rendered by the isolated browser instance, wherein the generated representation is in a different format than the digital content retrieved from the host computer;
   sending the generated representation to the destination device instead of the requested digital content in response to the request; and
   identifying that the retrieved digital content includes the infectious content when at least one process of the sandbox computer is identified as infected.

2. The method of claim 1, wherein the second request is sent to the host computer through the firewall.

3. The method of claim 1, wherein the format of the representation is a portable document file format (PDF).

4. The method of claim 1, wherein the format of the representation is a document form of the digital content.

5. The method of claim 1, wherein the sandbox computer includes a plurality of virtual processes implemented at a same physical computer.

6. The method of claim 1, wherein the sandbox computer is one of a plurality of different physical computers.

7. A non-transitory computer-readable storage medium having embodied thereon a program executable by a processor for implementing a method for protecting requesting devices from infectious content, the method comprising:
   receiving at a sandbox computer a request for digital content at an original universal resource locator (URL) hosted by a host computer, wherein the original URL was embedded in a communication sent to a destination device, and wherein the request for the digital content originated at the destination device and was intercepted by a firewall that reconfigured the original URL into a reconfigured URL pointing to the sandbox computer;
   generating a second request for the digital content, the second request generated at the sandbox computer and responsive to the request received at the sandbox computer in accordance with the reconfigured URL;
   sending the second request from the sandbox computer to the host computer;
   retrieving the digital content from the host computer corresponding to the original URL;
   rendering the digital content retrieved from the host computer, wherein the digital content is rendered by an isolated browser instance of the sandbox computer;
   generating a representation of the digital content as rendered by the isolated browser instance, wherein the generated representation is in a different format than the digital content retrieved from the host computer;
   sending the generated representation to the destination device instead of the requested digital content in response to the request; and
   identifying that the retrieved digital content includes the infectious content when at least one process of the sandbox computer is identified as infected.

8. The non-transitory computer-readable storage medium of claim 7, wherein the second request is sent to the host computer through the firewall.

9. The non-transitory computer-readable storage medium of claim 8, wherein the format of the representation is a portable document file format (PDF).

10. The non-transitory computer-readable storage medium of claim 7, wherein the format of the representation is a document form of the digital content.

11. The non-transitory computer-readable storage medium of claim 7, wherein the sandbox computer includes a plurality of virtual processes implemented at a same physical computer.

12. The non-transitory computer-readable storage medium of claim 7, wherein the sandbox computer is one of a plurality of different physical computers.

13. A system for protecting requesting devices from infectious content, the system comprising:
   a sandbox computer that includes a memory and a processor that executes instructions out of the memory, wherein the sandbox computer receives a request for digital content at an original universal resource locator (URL) hosted by a host computer, wherein the original URL was embedded in a communication sent to a destination device; and
   a firewall that initially received the request for the digital content from the destination device and that reconfigured the original URL into a reconfigured URL pointing to the sandbox computer, wherein the sandbox computer further:
      generates a second request for the digital content responsive to the request received at the sandbox computer in accordance with the reconfigured URL,
      sends the second request to the host computer,
      retrieves the digital content from the host computer corresponding to the original URL,
      renders the digital content retrieved from the host computer, wherein the digital content is rendered by an isolated browser instance of the sandbox computer,
      generates a representation of the digital content as rendered by the isolated browser instance, wherein the generated representation is in a different format than the digital content retrieved from the host computer,
      sends the generated representation to the destination device instead of the requested digital content in response to the request, and identifies that the retrieved digital content includes the infectious content when at least one process of the sandbox computer is identified as infected.

14. The system of claim 13, wherein the second request is sent to the host computer through the firewall.

15. The system of claim 13, wherein the format of the representation is a portable document file format (PDF).

16. The system of claim 13, further comprising a plurality of sets of program code, wherein each of the plurality of sets of the program code allow the processor to implement a plurality of virtual processes at the computer.

17. The system of claim 13, further comprising one or more additional computers that generate representations of respective sets of additional digital content.

\* \* \* \* \*